(12) United States Patent
Issa et al.

(10) Patent No.: US 7,805,373 B1
(45) Date of Patent: Sep. 28, 2010

(54) SYNCHRONIZING MULTIPLE PLAYBACK DEVICE TIMING UTILIZING DRM ENCODING

(75) Inventors: Alfredo C. Issa, Apex, NC (US); Gregory M. Evans, Raleigh, NC (US); Christopher M. Amidon, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 382 days.

(21) Appl. No.: 11/831,506

(22) Filed: Jul. 31, 2007

(51) Int. Cl.
*G06F 21/00* (2006.01)

(52) U.S. Cl. .................. 705/51; 705/14.4; 705/54; 725/42

(58) Field of Classification Search .................. 705/51, 705/14.4; 725/42
See application file for complete search history.

(56) References Cited

U.S. PATENT DOCUMENTS

| | | | |
|---|---|---|---|
| 5,155,591 | A | 10/1992 | Wachob |
| 5,231,494 | A | 7/1993 | Wachob |
| 5,959,623 | A | 9/1999 | van Hoff et al. |
| 5,974,398 | A | 10/1999 | Hanson et al. |
| 6,496,857 | B1 | 12/2002 | Dustin et al. |
| 6,574,793 | B1 | 6/2003 | Ngo et al. |
| 6,637,032 | B1 | 10/2003 | Feinleib |
| 6,698,020 | B1 | 2/2004 | Zigmond et al. |
| 6,718,551 | B1 | 4/2004 | Swix et al. |
| 6,738,978 | B1 | 5/2004 | Hendricks et al. |
| 6,769,130 | B1 | 7/2004 | Getsin et al. |
| 6,799,326 | B2 | 9/2004 | Boylan, III et al. |
| 6,820,277 | B1 | 11/2004 | Eldering et al. |
| 6,938,268 | B1 | 8/2005 | Hodge |
| 7,039,932 | B2 * | 5/2006 | Eldering ............ 725/35 |
| 7,099,331 | B2 | 8/2006 | Taylor |
| 7,100,183 | B2 | 8/2006 | Kunkel et al. |
| 7,134,132 | B1 | 11/2006 | Ngo et al. |
| 7,146,627 | B1 | 12/2006 | Ismail et al. |
| 7,155,210 | B2 | 12/2006 | Benson |
| 7,228,555 | B2 | 6/2007 | Schlack |
| 7,386,512 | B1 | 6/2008 | Allibhoy et al. |

(Continued)

FOREIGN PATENT DOCUMENTS

EP  0 989 722 A1  3/2000

(Continued)

OTHER PUBLICATIONS

Feng, Min; Zhu, Bin; "When DRM Meets Restricted Multicast: A Content Encryption Key Scheme for Multicast Encryption and DRM." Consumer Communications and Networking Conference, 2007. CCNC 2007. 4th IEEE Digital Object Identifier: 10.1109/CCNC.2007.211 Publication Year: 2007 , pp. 1048-1052.*

(Continued)

*Primary Examiner*—Evens J Augustin
*Assistant Examiner*—Calvin K Cheung
(74) *Attorney, Agent, or Firm*—Withrow & Terranova, PLLC

(57) ABSTRACT

A system and method are provided for synchronizing playback of media content on multiple playback devices utilizing Digital Rights Management (DRM) encoding. In general, multiple playback devices or users of those playback devices are associated to form a virtual group. A virtual group (VG) control function operates to synchronize advertisement (ad) slots within media content provided to the playback devices in the virtual group utilizing DRM encoding.

18 Claims, 5 Drawing Sheets

U.S. PATENT DOCUMENTS

| | | | |
|---|---|---|---|
| 7,652,594 | B2 | 1/2010 | Lamont et al. |
| 2002/0072966 | A1* | 6/2002 | Eldering et al. .............. 705/14 |
| 2002/0078444 | A1 | 6/2002 | Krewin et al. |
| 2002/0083439 | A1* | 6/2002 | Eldering ...................... 725/32 |
| 2002/0087402 | A1 | 7/2002 | Zustak et al. |
| 2002/0087978 | A1 | 7/2002 | Nicholson et al. |
| 2002/0095454 | A1 | 7/2002 | Reed et al. |
| 2002/0099606 | A1 | 7/2002 | Shlagman |
| 2002/0124249 | A1 | 9/2002 | Shintani et al. |
| 2002/0124251 | A1 | 9/2002 | Hunter et al. |
| 2002/0138291 | A1 | 9/2002 | Vaidyanathan et al. |
| 2002/0138440 | A1 | 9/2002 | Vaidyanathan et al. |
| 2002/0144263 | A1 | 10/2002 | Eldering et al. |
| 2002/0161838 | A1 | 10/2002 | Pickover et al. |
| 2002/0184047 | A1 | 12/2002 | Plotnick et al. |
| 2002/0184403 | A1 | 12/2002 | Dahlin et al. |
| 2003/0004793 | A1 | 1/2003 | Feuer et al. |
| 2003/0028888 | A1 | 2/2003 | Hunter et al. |
| 2003/0061607 | A1 | 3/2003 | Hunter et al. |
| 2003/0065804 | A1 | 4/2003 | Owerfeldt et al. |
| 2003/0114146 | A1 | 6/2003 | Benson |
| 2003/0149975 | A1 | 8/2003 | Eldering et al. |
| 2004/0003398 | A1 | 1/2004 | Donian et al. |
| 2004/0032881 | A1 | 2/2004 | Arai |
| 2004/0049600 | A1 | 3/2004 | Boyd et al. |
| 2004/0111742 | A1 | 6/2004 | Hendricks et al. |
| 2004/0148625 | A1 | 7/2004 | Eldering et al. |
| 2004/0163101 | A1 | 8/2004 | Swix et al. |
| 2004/0225719 | A1 | 11/2004 | Kisley et al. |
| 2005/0039205 | A1 | 2/2005 | Riedl |
| 2005/0091160 | A1 | 4/2005 | Kitze et al. |
| 2005/0097183 | A1 | 5/2005 | Westrelin |
| 2005/0097599 | A1* | 5/2005 | Plotnick et al. .............. 725/32 |
| 2005/0108776 | A1 | 5/2005 | Carver et al. |
| 2005/0251820 | A1 | 11/2005 | Stefanik et al. |
| 2005/0283796 | A1* | 12/2005 | Flickinger ................... 725/35 |
| 2006/0036490 | A1 | 2/2006 | Sagalyn |
| 2006/0075057 | A1 | 4/2006 | Gildea et al. |
| 2006/0095507 | A1 | 5/2006 | Watson |
| 2006/0107302 | A1 | 5/2006 | Zdepski |
| 2006/0110552 | A1 | 5/2006 | Ishida et al. |
| 2006/0168616 | A1 | 7/2006 | Candelore |
| 2006/0174312 | A1 | 8/2006 | Ducheneaut et al. |
| 2006/0174313 | A1 | 8/2006 | Ducheneaut et al. |
| 2006/0212900 | A1 | 9/2006 | Ismail et al. |
| 2006/0270395 | A1 | 11/2006 | Dhawan et al. |
| 2006/0294555 | A1 | 12/2006 | Xie |
| 2007/0015531 | A1 | 1/2007 | Disalvo |
| 2007/0027755 | A1 | 2/2007 | Lee |
| 2007/0028261 | A1 | 2/2007 | Bouilloux-Lafont |
| 2007/0058670 | A1 | 3/2007 | Konduru et al. |
| 2007/0100690 | A1* | 5/2007 | Hopkins ...................... 705/14 |
| 2007/0192789 | A1* | 8/2007 | Medford ...................... 725/31 |
| 2007/0198660 | A1* | 8/2007 | Cohen ......................... 709/219 |
| 2007/0204115 | A1* | 8/2007 | Abramson ................... 711/154 |

FOREIGN PATENT DOCUMENTS

| | | |
|---|---|---|
| EP | 1 067 792 A2 | 1/2001 |
| EP | 1162840 A2 | 6/2001 |
| EP | 1 418 514 A1 | 5/2004 |
| EP | 1 524 602 A2 | 4/2005 |
| EP | 1 528 478 A1 | 5/2005 |
| WO | 98/31149 A1 | 7/1998 |
| WO | WO 99/05584 A2 | 2/1999 |
| WO | WO 99/52285 A1 | 10/1999 |
| WO | WO 00/14951 A1 | 3/2000 |
| WO | 00/64165 A1 | 10/2000 |
| WO | WO 01/47156 A2 | 6/2001 |
| WO | WO 01/71524 A1 | 9/2001 |
| WO | WO0213112 A1 * | 2/2002 |
| WO | WO 02/19581 A1 | 3/2002 |
| WO | WO 02/45430 A2 | 6/2002 |
| WO | WO 02/054754 A2 | 7/2002 |
| WO | WO 03/053056 A1 | 6/2003 |
| WO | 2004/003879 A2 | 1/2004 |
| WO | 2004/049226 A1 | 6/2004 |
| WO | 2005/051020 A1 | 6/2005 |
| WO | 2005/065190 A2 | 7/2005 |

OTHER PUBLICATIONS

Margounakis, D.; Politis, D.; Boutsouki, C.; "SEAM: A Sound-Embedded Advertisement Model for Online Digital Music Distribution Automated Production of Cross Media Content for Multi-Channel Distribution", 2006. AXMEDIS '06. Second International Conference on Digital Object Identifier: 10.1109/AXMEDIS.2006. 43 Publication Year: 2006 pp. 273-282.*

No Author, Advertisement Bidding System and Method, (website), obtained Jun. 15, 2007, 2 pages, http://www.priorartdatabase.com/IPCOM/000138556.

S. Bailey et al., "The Architecture of Direct Data Placement (DDP) and Remote Direct Memory Access (RDMA) on Internet Protocols", (article), Dec. 2005, 21 pages, Internet informational RFC 4296, http://www.ietf.org/rfc/rfc4296.txt.

No Author, CableLabs, PacketCable TM 2.0, "Codec and Media Specification, PKT_AP_CODEC_MEDIA_I02-061013", (document), Oct. 13, 2006, 89 pages, http://www.packetcable.com/downloads/specs/PKT-SP-CODEC-MEDIA-I02-061013.pdf.

B. Cain et al., "Internet Group Management Protocol, Version 3", (article), Oct. 2002, 50 pages, Internet informational RFC 3376, http://www.ietf.org/rfc/rfc3376.txt.

No Author, "Internet Protocol: DARPA Internet Program Protocol Specification", (article), Sep. 1981, 49 pages, Internet informational RFC 791, http://www.ietf.org/rfc/rfc791.txt.

S. Deering et al., "Internet Protocol, Version 6 (IPv6) Specification", (article), Dec. 1998, 37 pages, Internet informational RFC 2460, http://www.ietf.org/rfc/rfc2460.txt.

James Gwertzman et al., "An Analysis of Geographical Push-Caching," (article), May 1995, pp. 51-55, in Proceedings of the 5th IEEE Workshop on Hot Topics in Operating Systems, Orcas Island, WA.

Jeff Hilland et al., "RDMA Protocol Verbs Specification (Version 1.0)", (article), Apr. 2003, 242 pages, http://www.rdmaconsortium.org/home/draft-hilland-iwarp-verbs-v1.0-RDMAC.pdf.

No Author, Internet Cache Protocol, (website), obtained Jun. 15, 2007, 2 pages, http://en.wikipedia.org/wiki/Internet_Cache_Protocol.

No Author, ITU Publications: Welcome, (website), obtained Jun. 26, 2008, 1 page, http://www.itu.int/publications/.

J. Postel, "User Datagram Protocol", (article), Aug. 28, 1980, 3 pages, Internet informational RFC 768, http://www.ietf.org/rfc/rfc768.txt.

R. Recio et al., "A Remote Direct Memory Access Protocol Specification," (article), Sep. 8, 2006, 60 pages, Internet Draft, http://www.ietf.org/internet-drafts/draft-ietf-rddp-rdmap-07.txt.

R. Recio et al., "An RDMA Protocol Specification (Version 1.0)", (article), Oct. 2002, 82 pages, http://www.rdmaconsortium.org/home/draft-recio-iwarp-rdmap-v1.0.pdf.

Robert Brodersen, "InfoPad An Experiment in System Level Design and Integration," (article), 1997, 2 pages, Dept. of EECS University of California, Berkeley, Proceedings of the 34th Annual Conference on Design Automation.

A. Romanow et al., "Remote Direct Memory Access (RDMA) over IP Problem Statement", (article), Dec. 2005, 19 pages, Internet informational RFC 4297, http://www.ietf.org/rfc/rfc4297.txt.

H. Schulzrinne et al., "Real Time Streaming Protocol (RTSP)", (article), Apr. 1998, 86 pages, Internet informational RFC 2326, http://www.ietf.org/rfc/rfc2326.txt.

H. Schulzrinne et al., "RTP: A Transport Protocol for Real-Time Applications", (article), Jul. 2003, 98 pages, Internet informational RFC 3550, http://www.ietf.org/rfc/rfc3550.txt.

Hemel Shah et al., "Direct Data Placement over Reliable Transports (Version 1.0)", (article), Oct. 2002, 35 pages, http://www.rdmaconsortium.org/home/draft-shah-iwarp-ddp-v1.0.pdf.

No Author, SnapStream:PC DVR and TV tuner software, (website), obtained Jun. 15, 2007, 1 page, http://www.snapstream.com.

No Author, Squid Cache, (website), obtained Jun. 15, 2007, 3 pages, http://en.wikipedia.org/wiki/Squid_cache.

Thomas E. Truman et al., "The InfoPad Multimedia Terminal: A Portable Device for Wireless Information Access," (article), Oct. 1998, pp. 1073-1087, Transactions on Computers, vol. 47, Issue 10, Abstract only, http://csdl2.computer.org/persagen/DLAbsToc.jsp?resourcePath=/dl/trans/tc/&toc=comp/trans/tc/1998/10/txtoc.xml&DOI=10.1109/12.729791.

S. Wenger et al., "RTP Payload Format for H.264 Video", (article), Feb. 2005, 65 pages, Internet informational RFC 3984, http://www.ietf.org/rfc/rfc3984.txt.

* cited by examiner

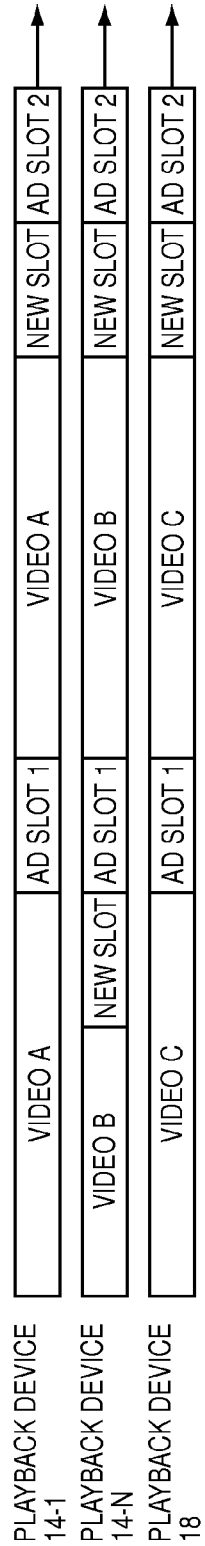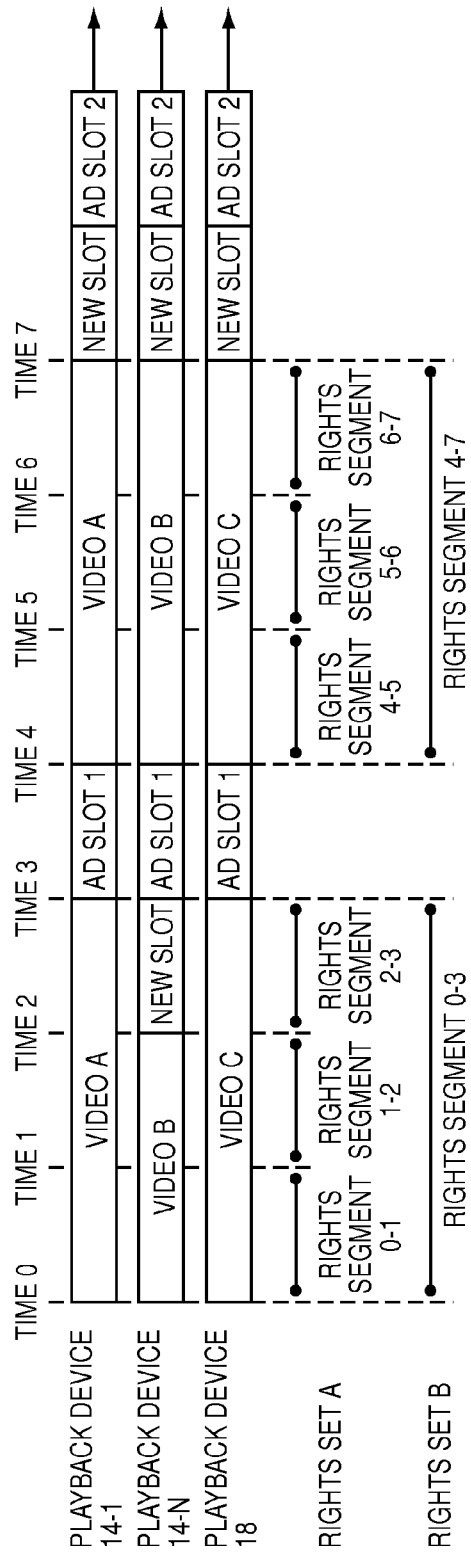
FIG. 3
FIG. 4
FIG. 5

SYNCHRONIZING MULTIPLE PLAYBACK DEVICE TIMING UTILIZING DRM ENCODING

FIELD OF THE INVENTION

The present invention relates to coordinating playback of media content items at multiple playback devices.

BACKGROUND OF THE INVENTION

There is an increasing trend to view video content on devices other than a television such as a personal computer, an Apple iPod®, a Microsoft Zune™, a mobile phone such as an Apple iPhone, a Personal Digital Assistant (PDA), or the like. Unlike a television, these devices primarily have a one-to-one mapping with a user. As such, a first user may be watching video content on his device while a second user that is proximate to, or otherwise associated with, the first user may be watching different content on her device. For example, consider three users A, B, and C that are in close physical proximity such as in a living room of their home. User A is viewing previously downloaded or Video-on-Demand (VoD) content on a wireless handheld device, such as a Microsoft Zune™, Nintendo DS®, or other Wireless Fidelity (WiFi)-capable playback handheld video device. User B is watching content on a High Definition Television (HDTV) device provided by an associated set-top box that functions as a Digital Video Recorder (DVR) and a digital signal decoder. User C is watching a downloaded video from a service such as Apple iTunes® on a personal computer.

In such a system or in similar systems, the opportunity exists to provide the users with a common experience. As such, there is a need for a system and method of coordinating playback of media content at multiple playback devices.

SUMMARY OF THE INVENTION

The present invention provides a system and method for synchronizing playback of media content on multiple playback devices utilizing Digital Rights Management (DRM) encoding. In general, multiple playback devices or users of those playback devices are associated to form a virtual group. In operation, a virtual group (VG) control function coordinates media content items selected for playback at the playback devices and utilizes Digital Rights Management (DRM) encoding to restrict playback of the media content items such that the media content items remain coordinated during playback at the playback devices.

In one embodiment, the VG control function coordinates the media content items by synchronizing or otherwise coordinating advertisement (ad) slots within media content provided to the playback devices in the virtual group. The VG control function then utilizes DRM encoding to restrict playback of the media content items such that that ad slots remain coordinated during playback of the media content items at the playback devices. More specifically, the VG control function obtains media content to be provided to the playback devices. The media content to be provided to the playback devices may or may not be the same media content. The VG control function first coordinates one or more ad slots in the media content to be provided to the playback devices. Then, for each of the playback devices, the VG control function segments the corresponding media content, generates timing rights for each of the segments, and encodes the media content. The timing rights for the segments are defined such that playback of the segments is restricted in a manner that coordinates the ad slots in the media content with the ad slots in the media content provided to the other playback devices. The VG control function provides the encoded media content and timing rights to the playback devices. At the playback devices, playback of the media content is restricted based on the timing rights for the segments such that the ad slots at the playback devices are coordinated.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 3 illustrates exemplary media content items according to one embodiment of the present invention;

FIG. 4 illustrates the exemplary media content items of FIG. 3, wherein the advertisement (ad) slots of the media content items have been coordinated according to one embodiment of the present invention;

FIG. 5 illustrates the exemplary media content items of FIG. 4 wherein the media content items have been segmented and timing rights for the segments have been defined according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
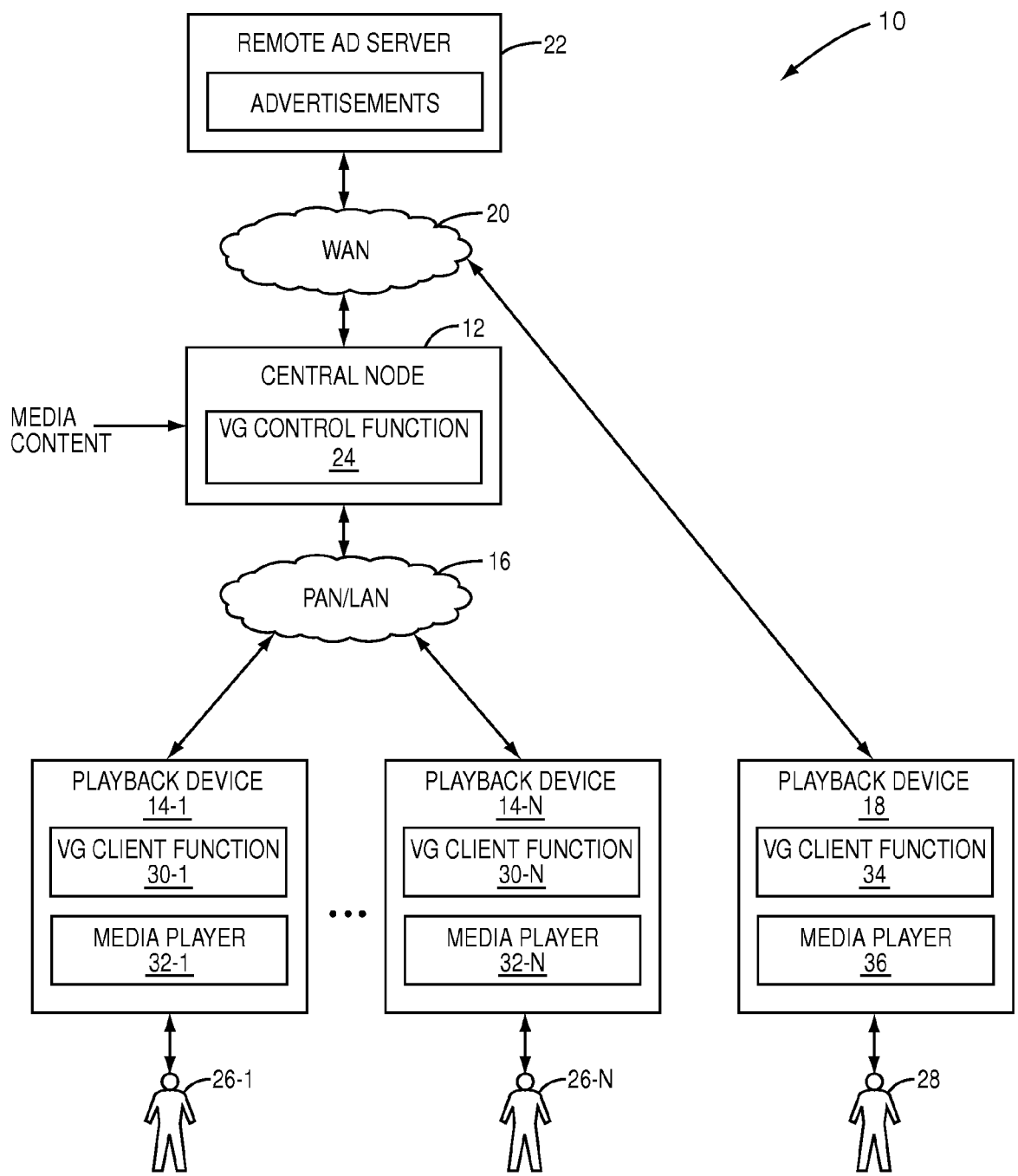
FIG. 1 illustrates a system for coordinating advertisements at multiple playback devices according to one embodiment of the present invention.

The present invention relates to coordinating advertisements on multiple playback devices during playback of media content. FIG. 1 illustrates a system 10 providing coordinated advertisement (ad) slots at multiple playback devices using Digital Rights Management (DRM) encoding according to one embodiment of the present invention. In general, the system 10 includes a central node 12 communicatively coupled to playback devices 14-1 through 14-N via a network 16, which in this example is a Personal Area Network (PAN) or Local Area Network (LAN), and, optionally, a playback device 18 via a Wide Area Network (WAN) 20. Note that the central node 12 may alternatively be connected to the playback device 18 via a separate PAN or LAN. In this embodiment, the central node 12 is also communicatively coupled to a remote advertisement, or "ad," server 22 via the WAN 20. As used herein, a PAN may be formed by devices having a wired connection such as a Universal Serial Bus (USB) connection, a local wireless connection such as a Bluetooth or IEEE 802.11 connection, or the like; a LAN may be, for example, an Ethernet network, a Wireless Fidelity (WiFi) network, or the like; and a WAN may be any type or combination of WANs such as, for example, the Internet.

According to one embodiment of the present invention, a virtual group (VG) control function 24 is hosted by the central node 12 and the playback devices 14-1 through 14-N and 18 or their associated users 26-1 through 26-N and 28 are either statically or dynamically associated to form a virtual group. For this description, the virtual group is referred to as a virtual group of playback devices. The virtual group may be formed on the user level or the playback device level. In this embodiment, the playback devices 14-1 through 14-N are proximate to one another. For example, the playback devices 14-1 through 14-N may be located or carried by users within a room, a house, a building, or the like. In contrast, the playback device 18 is at a remote location. However, the present invention is not limited thereto. For example, all of the playback devices 14-1 through 14-N and 18 may be remote from one another and connected to the central node 12 via the WAN 20. In one embodiment, the users 26-1 through 26-N and 28 are having a shared experience. The users 26-1 through 26-N are having a shared experience as a result of their close physical proximity to one another. In addition, the user 28 may interact with one or more of the users 26-1 through 26-N via, for example, Instant Messaging (IM), phone, Voice-over-Internet Protocol (VoIP), or the like such that the user 28 has a shared experience with the users 26-1 through 26-N.

The VG control function 24 may be implemented in software, hardware, or a combination of software and hardware. The VG control function 24 generally operates to provide media content to the playback devices 14-1 through 14-N and 18 in the virtual group and to coordinate ad slots in the media content provided to the playback devices 14-1 through 14-N and 18 utilizing DRM encoding. As used herein, an "ad slot" is a break in content into which an advertisement is or may be inserted. In addition or alternatively, an ad slot may be a defined period or segment of content during which a visual, audio, or audio-visual advertisement may be overlaid or superimposed upon the content. The VG control function 24 may also obtain targeted advertisements for the ad slots from the remote ad server 22 and either insert the targeted advertisements into the coordinated ad slots in the media content or provide the targeted advertisements to the playback devices 14-1 through 14-N and 18 for insertion into the coordinated ad slots. Alternatively, the VG control function 24 may provide references to the targeted advertisements for the coordinated ad slots, where the references enable the playback devices 14-1 through 14-N and 18 to obtain the advertisements from the central node 12 or the remote ad server 22.

The media content provided to the playback devices 14-1 through 14-N and 18 may be, for example, broadcast television content, Video on Demand (VoD) content, streaming video content, or the like and may be provided to the central node 12 from a remote service such as, for example, a cable television service, a satellite television service, an Internet Protocol Television (IPTV) service, or the like. In addition or alternatively, the media content, or at least some media content items, may be stored by the central node 12. For example, the central node 12 may be enabled to receive streaming video content from one or more remote services and also store one or more media content items such as one or more movies or television programs.

The media content provided to the playback devices 14-1 through 14-N and 18 may be homogeneous content or heterogeneous content. As used herein, "homogenous content" is the same media content played at substantially the same time. For example, the playback devices 14-1 through 14-N and 18 may be playing the same movie and be at substantially the same point during playback of the movie. As another example, the playback devices may 14-1 through 14-N and 18 may be playing the same video content stream. In contrast, "heterogeneous content" refers to different content being played by the playback devices 14-1 through 14-N and 18. In one embodiment, the heterogeneous content is heterogeneous video content such that different video content is being played or viewed at the playback devices 14-1 through 14-N and 18. For example, each of the playback devices 14-1 through 14-N and 18 may be playing a different video, movie, television program, or the like. Note that, as used herein, heterogeneous content is to include the situation where two or more of the playback devices 14-1 through 14-N are playing the same video content but are at different points during playback of the video content. For example, the playback device 14-1 may be at the beginning of playback of a movie and the playback device 18 may be at some intermediate point during playback of the same movie.

While the discussion herein focuses on video content, the present invention is not limited thereto. The present invention is equally applicable to coordinating advertisements in other types of media content such as, for example, songs, radio broadcasts, slideshows, video games where action in a video game may be paused in order to insert an advertisement, or the like.

Still further, the present invention is also applicable to coordinating advertisements when some of the playback devices 14-1 through 14-N and 18 are playing a first media content type such as video content and others of the playback devices are playing a second media content type such as audio content. For example, one or more of the playback devices 14-1 through 14-N and 18 may be playing video content while others are playing audio content.

The playback device 14-1 may be, for example, a personal computer; a mobile device such as a Personal Digital Assistant (PDA), a mobile telephone such an Apple iPhone, a Portable Media Player (PMP) such as a Microsoft Zune™, Nintendo® DS, or Sony PSP®, or the like; a set-top box; a set-top box function hosted by or incorporated into a computing device; a Digital Video Recorder (DVR) such as a TiVo® DVR; or any other type of presentation device having media playback or presentation capabilities and an interface to the network 16. The playback device 14-1 includes a virtual group (VG) client function 30-1, which is hereinafter referred to as a client function 30-1, and a media player 32-1. The client function 30-1 and the media player 32-1 may each be implemented in software, hardware, or a combination of software and hardware. The media player 32-1 operates to play media content provided to the playback device 14-1 from the central node 12.

Similarly, the playback device 14-N may be, for example, a personal computer; a mobile device such as a PDA, a mobile telephone such as an Apple iPhone, a PMP such as a Microsoft Zune™, Nintendo® DS, or Sony PSP®, or the like; a set-top box; a set-top box function hosted by or incorporated into a computing device; a DVR such as a TiVo® DVR; or any other type of presentation device having media playback or presentation capabilities and an interface to the network 16. The playback device 14-N includes a client function 30-N and a media player 32-N. Likewise, the playback device 18 may be, for example, a personal computer; a mobile device such as a PDA, a mobile telephone such as an Apple iPhone, a PMP such as a Microsoft Zune™, Nintendo® DS, or Sony PSP®, or the like; a set-top box; a set-top box function hosted by or incorporated into a computing device; a DVR such as a TiVo® DVR; or any other type of presentation device having media playback or presentation capabilities and an interface to the WAN 20. The playback device 18 includes a client function 34 and a media player 36.

Note that, as will be apparent to one of ordinary skill in the art upon reading this description, numerous variations of the illustrated embodiment of the system 10 are possible and are to be considered within the scope of the present invention. For example, the VG control function 24 may alternatively be hosted by a remote server such as, for example, the remote ad server 22 where the playback devices 14-1 through 14-N may then be connected to the remote ad server 22 via the WAN 20. Further, while the VG control function 24 is illustrated as being hosted by the control node 12, the VG control function 24 may alternatively be hosted by one of the playback devices 14-1 through 14-N and 18 or distributed among two or more of the playback devices 14-1 through 14-N and 18.

Figure 2:
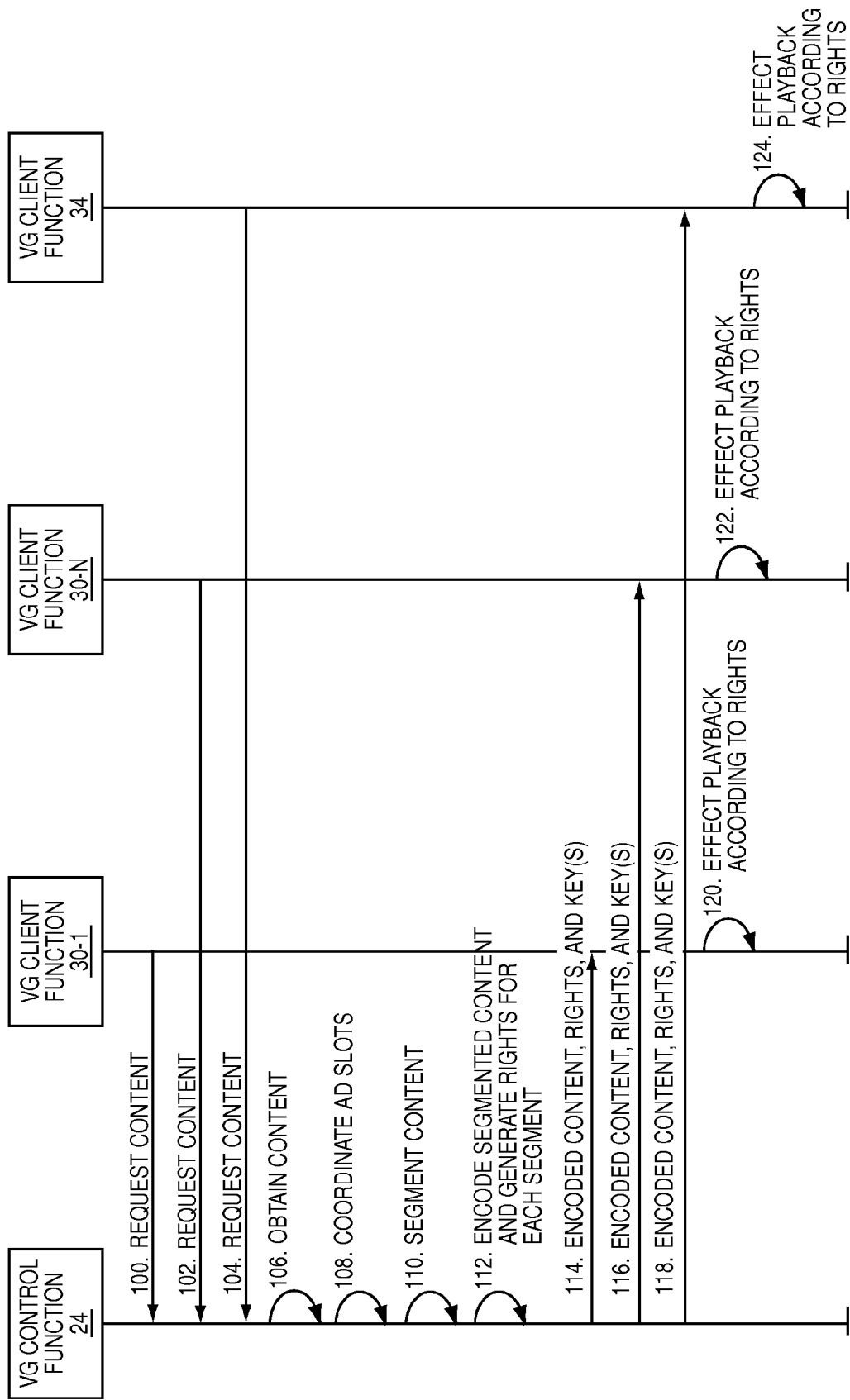
FIG. 2 illustrates the operation of the system of FIG. 1 according to one embodiment of the present invention.

FIG. 2 illustrates the operation of the system 10 of FIG. 1 according to one embodiment of the present invention. In this example, each of the client functions 30-1, 30-N, and 34 requests a media content item from the VG control function 24 (steps 100-104). Each of the requested media content items may be, for example, a streaming video channel, a broadcast television channel, a movie or television program offered by a VoD service, or the like. The media content items requested by the client functions 30-1, 30-N, and 34 may or may not be the same media content item. In one embodiment, the client functions 30-1, 30-N, and 34 request content in response to selections by the users 26-1, 26-N, and 28. In this example, the three users 26-1, 26-N, and 28 are illustrated as having requested content at substantially the same time for clarity and ease of discussion. However, the present invention is not limited thereto. For example, the user 26-1 may first request content. Thereafter, while the user 26-1 is viewing his selected content, the user 26-N may request content. At this point, more than two members of the virtual group are active. As such, the VG control function 24 proceeds to coordinate ad slots in the manner described below. Thereafter, if the user 28 requests content, the VG control function 24 may repeat the coordination process for all three playback devices 14-1, 14-N, and 18 or perform the coordination process for only the playback device 18 in order to coordinate the ad slots in the media content requested by the playback device 18 with the ad slots in the media content being played back by the playback devices 14-1 and 14-N.

Returning to the illustrated example, upon receiving the requests from the client functions 30-1, 30-N, and 34 of the playback devices 14-1, 14-N, and 18, the VG control function 24 obtains the requested media content items (step 106). As discussed above, the VG control function 24 may obtain the requested media content items from one or more remote services or from local storage. The VG control function 24 then coordinates the ad slots in the media content items, or for streaming content, at least upcoming ad slots in the media content items (step 108). The ad slots may be coordinated by, for example, synchronizing the ad slots. However, the present invention is not limited thereto. For streaming media content, metadata or information describing the streaming media content may be provided to, or obtained by, the VG control function 24 to enable coordination of ad slots. Note that if each of the client devices 14-1, 14-N, and 18 requests the same media content item at substantially the same time, pre-existing ad slots or natural transitions in the media content for the playback devices 14-1, 14-N, and 18 may already be synchronized. Thus, in this situation, the VG control function 24 may coordinate the pre-existing ad slots or natural transitions by maintaining the pre-existing synchronization between the ad slots.

More specifically, the media content items may or may not have pre-existing ad slots. If the media content items do have pre-existing ad slots, the VG control function 24 operates to coordinate the ad slots by, for example, extending or condensing the pre-existing ad slots, removing the pre-existing ad slots and inserting new ad slots, or the like, or any combination thereof. If the media content items do not have pre-existing ad slots, the VG control function 24 may insert ad slots such that the inserted ad slots are coordinated in the desired manner. Alternatively, the VG control function 24 may detect natural transitions in the media content items such as, for example, scene transitions, chapter breaks, or the like and insert ad slots at select ones of the natural transitions. The inserted ad slots may be adjusted by, for example, extending or condensing the ad slots to further coordinate the inserted ad slots. For more information on exemplary ways to coordinate ad slots in an environment similar to that of the present invention, the interested reader is directed to U.S. patent application Ser. No. 11/688,404, entitled COORDINATING ADVERTISEMENTS AT MULTIPLE PLAYBACK DEVICES, which was filed on Mar. 20, 2007 and is hereby incorporated herein by reference in its entirety.

Once the VG control function 24 has coordinated the ad slots, the VG control function 24 segments the media content items (step 110). The size of the segments may be, for example, based on the particular needs of the system 10 or desired coordination scheme, configured by the one or more of the users 26-1, 26-N, and 28, configured by a distributor of the media content items, configured by an operator or user associated with the VG control function 24, or selected based on a trade-off between rights management overhead and desired segment size for the coordination scheme. In one embodiment, the media content items may be segmented based on the coordinated ad slots. For example, media content between two ad slots may be one segment. In another embodiment, the media content between ad slots may be segmented into predetermined substantially fixed segment sizes such as, for example, five (5) minute segments. The VG control function 24 may actually segment the media content items or logically segment the media content items. The media content items may be logically segmented by, for example, using associated metadata identifying a start point and an end point for each segment.

Once the media content items are segmented, the VG control function 24 encodes the segmented media content items and generates rights, or timing rights, for each segment of each of the media content items (step 112). Note for streaming media content, the VG control function 24 segments and encodes the segments of the streaming media content and generates the timing rights as the media content is streamed to the VG control function 24. For each one of the playback devices 14-1, 14-N, and 18, the timing rights define a start time and an end time for each of the segments of the corresponding media content item. The start time and end time may each be, for example, a particular time of day such as 7:00 PM EST and 7:10 PM EST. As another example, the start time and end time may each be relative to a system time. The system time may be the beginning of playback of the media content item at the playback device 14-1, 14-N, or 18 or a time maintained by one of the playback devices 14-1, 14-N, or 18 or the VG control function 24. The timing rights are defined such that playback of the segments of the media content items at the playback devices 14-1, 14-N, and 18 is restricted such that the ad slots remain coordinated during playback of the media content items at the playback devices 14-1, 14-N, and 18. Thus, even if the users 26-1, 26-N, and 28 are enabled to fast-forward, rewind, or pause playback, playback of the segments is restricted to force coordination of the ad slots.

In addition, the VG control function 24 may select advertisements for the ad slots in the media content items. In one embodiment, the VG control function 24 selects targeted advertisements for the ad slots based on information such as, for example, profiles of the users 26-1, 26-N, and 28; profiles of the playback devices 14-1, 14-N, and 18; metadata or information describing the requested media content items; or the like, or any combination thereof. For more information relating to the selection of targeted advertisements, the interested reader is again directed to U.S. patent application Ser. No. 11/688,404. Once the advertisements for the ad slots are selected, the VG control function 24 may obtain the selected advertisements from the remote ad server 22. The VG control function 24 may then insert the advertisements into the ad slots prior to or after encoding. Alternatively, the VG control function 24 may store the advertisements and provide references to the advertisements to the playback devices 14-1, 14-N, and 18 in association with the ad slots such that the client functions 30-1, 30-N, and 34 can obtain the advertisements for the ad slots from the VG control function 24 as needed. As yet another alternative, the VG control function 24 may provide references to the advertisements to the playback devices 14-1, 14-N, and 18 such that the client functions 30-1, 30-N, and 34 can thereafter obtain the advertisements from the remote ad server 22 or some other remote source. Finally, in another embodiment, the media content items may already include advertisements within the ad slots in which case the VG control function 24 enables these preexisting advertisements to remain in the ad slots. Alternatively, the VG control function 24 may replace the preexisting advertisements with targeted advertisements, where the preexisting advertisements may be used as default advertisements if no targeted advertisements can be found.

FIGS. 3-5 illustrate the process of coordinating the ad slots in the media content items, segmenting the media content items, and generating the timing rights for each of the segments according to an exemplary embodiment of the present invention. FIG. 3 illustrates portions of the media content items requested by the client functions 30-1, 30-N, and 34 of the playback devices 14-1, 14-N, and 18 including pre-existing ad slots according to one embodiment of the present invention. In this example, the client function 30-1 of the playback device 14-1 has requested VIDEO A, which includes a number of pre-existing ad slots (Ad Slot 1, Ad Slot 2, etc.). The client function 30-N of the playback device 14-N has requested VIDEO B, which includes a number of pre-existing ad slots (Ad Slot 1, Ad Slot 2, etc.). Lastly, the client function 34 of the playback device 18 has requested VIDEO C, which includes a number of pre-existing ad slots (Ad Slot 1, Ad Slot 2, etc.).

FIG. 4 illustrates the requested media content items after coordination of the ad slots. In this example, the ad slots have been coordinated by extending the ad slots, or more specifically adding new ad slots. As a result, the ad slots (Ad Slot 1, Ad Slot 2, etc.) of the media content items (VIDEO A, VIDEO B, and VIDEO C) are substantially synchronized. While the ad slots are coordinated by extending the ad slots in this example, the present invention is not limited thereto. Further, while the ad slots are coordinated by synchronizing the ad slots in this example, the ad slots may be coordinated in any desired manner. For example, the ad slots may alternatively be staggered.

FIG. 5 illustrates segmentation of the media content items of FIG. 4 and the assignment of timing rights to the segments. In this example, a number of time points (Time 0, Time 1, Time 2, etc.) are illustrated. As a first example, the VG control function 24 may segment the media content items (VIDEO A-VIDEO C) into a number of segments: Segment 0-1 from Time 0 to Time 1, Segment 1-2 from Time 1 to Time 2, Segment 2-3 from Time 2 to Time 3, etc. The VG control function 24 then defines timing rights (Rights Segment 0-1, Rights Segment 1-2, Rights Segment 2-3, etc.). Note that in this example, no timing rights are defined for the ad slots. As such, the advertisements in the ad slots begin playback at the end of the previous segment and preferably complete playback prior to the start time of the next segment. However, the VG control function 24 may alternatively define timing rights for the ad slots.

As a second example, the VG control function 24 may segment the media content items (VIDEO A-VIDEO C) to form single segments between ad slots. More specifically, as illustrated, the VG control function 24 may form a segment (Segment 0-3) from Time 0 to Time 3 and another segment (Segment 4-7) from Time 4 to Time 7. The VG control function 24 then generates timing rights for those segments (Rights Segment 0-3 and Rights Segment 4-7). While in this example each of the segment sizes for each media content item is the same, the present invention is not limited thereto. Each of the media content items may have different segment sizes. Further, within each media content item, the segment sizes may vary.

Returning to FIG. 2, once the media content items are encoded and the timing rights are generated, the VG control function 24 provides the encoded media content item requested by the client function 30-1, the timing rights for the segments of the encoded media content item, and if needed one or more keys for decoding the encoded media content item to the client function 30-1 of the client device 14-1 (step 114). Likewise, the VG control function 24 provides the encoded media content items requested by the client functions 30-N and 34, the timing rights for the segments of the encoded media content items, and if needed one or more keys for decoding the encoded media content items to the client functions 30-N and 34, respectively (steps 116 and 118). Alternatively, the VG control function 24 may provide the encoded media content to the client functions 30-1, 30-N, and 34 and thereafter provide the timing rights and key for each segment just prior to the start times of the segments in a "just-in-time" manner. More specifically, the timing rights and key for each segment may be provided to the client functions 30-1, 30-N, and 34 a predetermined amount of time just before playback of the segments is to begin.

Upon receiving the encoded media content items, the client functions 30-1, 30-N, and 34 effect playback of the media content items according to the timing rights of the segments of the media content items (steps 120-124). The client functions 30-1, 30-N, and 34 may, for example, interact with the VG client function 24 to validate the timing rights and keys once at the beginning of playback and/or prior to the beginning of each segment. Using the client function 30-1 and the Rights Set B of FIG. 5 as an example, the client function 30-1 examines the timing rights (Rights Segment 0-3) to determine when the first segment (Segment 0-3) of the encoded media content item is to begin playback. If the timing rights are relative to the beginning of playback, the client function 30-1 may begin playback as soon as the encoded media content items are received, at some specified time, or when instructed by the VG control function 24. When it is time for the first segment to begin playback, the client function 30-1 decodes the first segment (Rights Segment 0-3) using the corresponding key and provides the decoded video content to the media player 32-1 (FIG. 1) for playback. The user 26-1 may optionally be enabled to fast-forward, rewind, and pause playback of the first segment (Rights Segment 0-3). Once the end time for the first segment (Rights Segment 0-3) is reached, the client function 30-1 stops playback of the first segment.

The client function 30-1 then effects playback of the advertisement for the first ad slot (Ad Slot 1). The advertisement for the ad slot (Ad Slot 1) may already be included in the media content item. Alternatively, the advertisement may be provided to the client function 30-1 separately and inserted into the ad slot (Ad Slot 1). As another alternative, a reference to the advertisement may be provided to the client function 30-1, where the client function 30-1 uses the reference to obtain the advertisement from the VG control function 24 or a remote source such as the remote ad sever 22 (FIG. 1) and then inserts the advertisement into the ad slot (Ad Slot 1). Note that functions such as fast-forwarding, pausing, and rewinding may or may not be enabled during the ad slot. Also, while no timing rights are defined for the ad slot in this example, the present invention is not limited thereto. Timing rights may also be defined for the ad slots. When the start time for the next segment (Rights Segment 4-7) is reached, the client function 30-1 begins playback of the next segment (Rights Segment 4-7). The process continues until playback is complete or terminated by the user 26-1.

Typically, timing rights for each segment provide sufficient time for the user 26-1 to view the entire segment. The timing rights may include additional time such that the user 26-1 has sufficient time to view the entire segment even with a reasonable amount of pausing and rewinding. If playback reaches the end of the first segment before the end time of the first segment, the user 26-1 may be enabled to view some other media content until the end time of the segment is reached, be presented with an advertisement or instructions asking the user 26-1 to wait, or the like.

Figure 6:
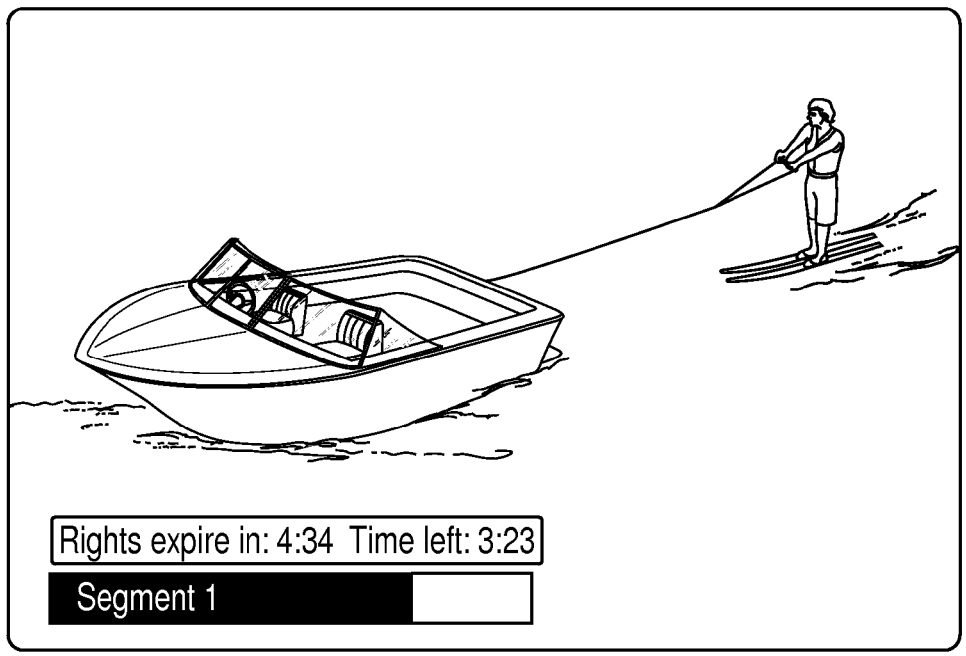
FIG. 6 illustrates an exemplary screen shot of a media content item presented to a viewer according to one embodiment of the present invention.
Figure 7:
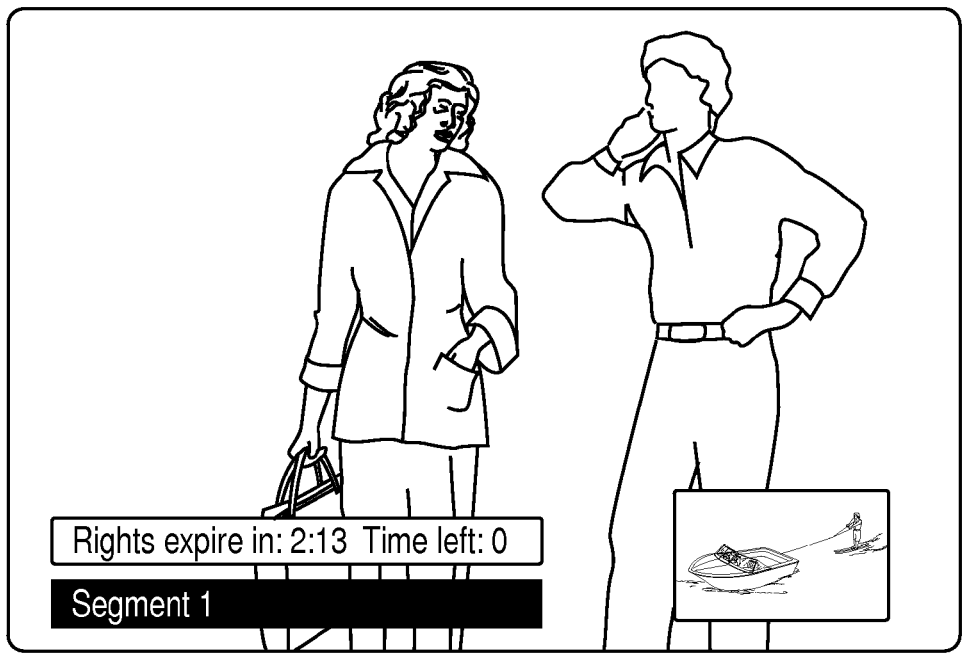
FIG. 7 illustrates another exemplary screen shot of a media content item presented to a viewer according to one embodiment of the present invention.

More specifically, FIG. 6 illustrates a frame of a media content item where playback is restricted according to the present invention. As illustrated, information such as time remaining before the end of the user's right to playback the current segment of the media content item and the amount of time in the current segment may be presented to the user. If, as illustrated in FIG. 7, playback of the current segment is complete before the end time for the current segment, the user may be enabled to switch to another media content item such as a broadcast television channel until the end time for the current segment is reached. Note that the user may switch to another media content item at any time if desired. In this example, playback of the current segment has completed with 2 minutes and 13 seconds remaining before the end time for the current segment. As such, the user has switched playback to another media content item. The current segment of the media content item may also be presented using a Picture-in-Picture (PIP) feature or the like. When the end time of the current segment is reached, the client functions 30-1, 30-N, and 34 may automatically switch back to the media content item, prompt the user to switch back to the media content item, notify the user, or the like.

Returning to FIG. 2, after providing the encoded content, timing rights, and keys to the client functions 30-1, 30-N, and 34, the VG control function 24 may further operate to dynamically update the segmentation of the encoded media content items and/or the timing rights for the segments in response to triggering events such as, for example, one of the playback devices 14-1, 14-N, or 18 becoming inactive, a new playback device in the virtual group becoming active as indicated by the receipt of a request for a media content item, a request for a new media content item from one or more of the playback devices 14-1, 14-N, and 18, or the like. More specifically, in response to the triggering event, the VG control function 24 may repeat all or some of steps 106-112 in order to obtain any new media content item(s), dynamically update the coordination of the ad slots, update the segmenting of the media content items, generate timing rights for the updated segments, and encode the updated segments. Alternatively, if the triggering event is the activation of the new playback device or a request for a new media content item from one of the playback devices 14-1, 14-N, and 18, the VG control function 24 may coordinate the ad slots in the media content requested by that playback device with the previously coordinated ad slots of the media content requested by the other playback devices rather than updating the media content for all of the playback devices.

Figure 8:
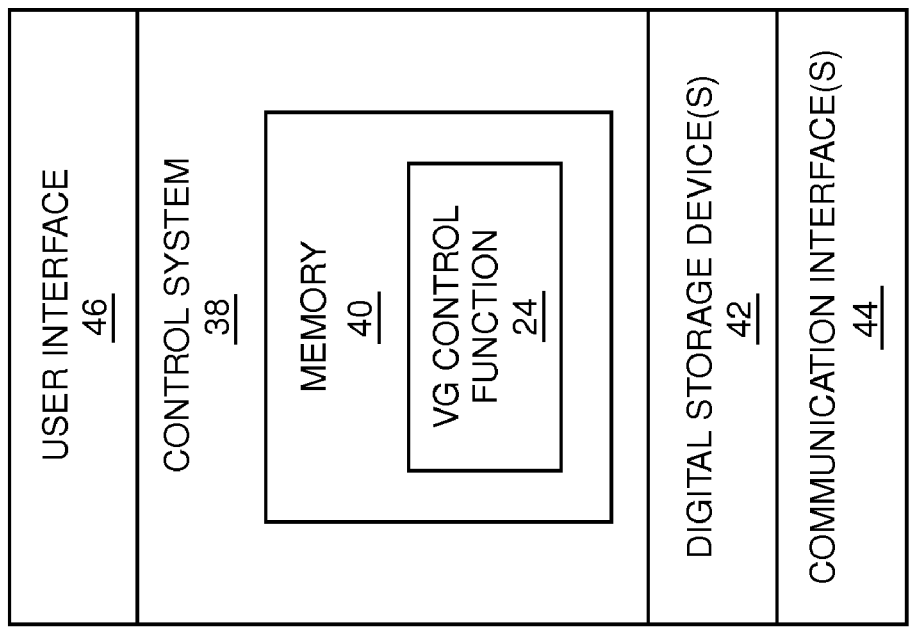
FIG. 8 is a block diagram of the central node of FIG. 1 according to one embodiment of the present invention.

FIG. 8 is a block diagram of an exemplary embodiment of the central node 12 of FIG. 1. In general, the central node 12 includes a control system 38 having associated memory 40. In this embodiment, the VG control function 24 is implemented in software and stored in the memory 40. However, the present invention is not limited thereto. The VG control function 24 may be implemented in software, hardware, or a combination thereof. The central node 12 may also include one or more digital storage devices 42, one or more communication interfaces 44 communicatively coupling the central node 12 to the playback devices 14-1 through 14-N and 18 and the remote ad server 22, and a user interface 46, which may include components such as one or more user input devices, a display, and the like.

Figure 9:
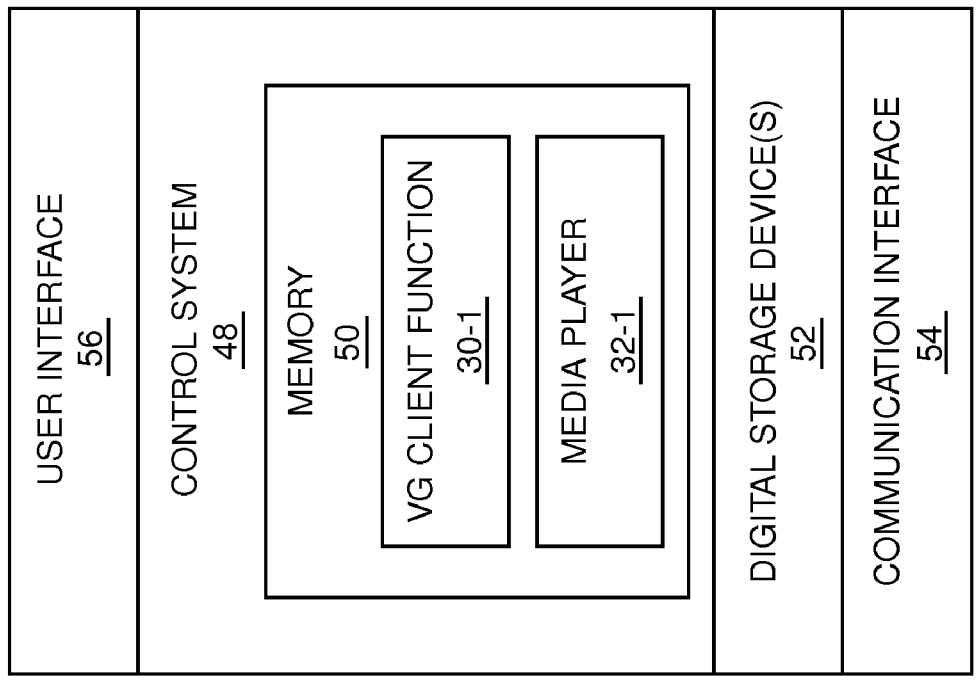
FIG. 9 is a block diagram of one of the playback devices of FIG. 1 according to one embodiment of the present invention.

FIG. 9 is a block diagram of an exemplary embodiment of the playback device 14-1 of FIG. 1. This discussion is equally applicable to the other playback devices 14-2 through 14-N and 18. In general, the playback device 14-1 includes a control system 48 having associated memory 50. In this embodiment, the client function 30-1 and the media player 32-1 are implemented in software and stored in the memory 50. However, the present invention is not limited thereto. Each of the client function 30-1 and the media player 32-1 may be implemented in software, hardware, or a combination thereof. The playback device 14-1 may also include one or more digital storage devices 52, a communication interface 54 communicatively coupling the playback device 14-1 to the VG control function 24 at the central node 12, and a user interface 56, which may include components such as one or more user input devices, a display, one or more speakers, and the like.

Those skilled in the art will recognize improvements and modifications to the preferred embodiments of the present invention. All such improvements and modifications are considered within the scope of the concepts disclosed herein and the claims that follow.

What is claimed is:
1. A method comprising:
coordinating a plurality of different media content items selected for playback at a plurality of playback devices to provide a plurality of coordinated media content items, each of the plurality of different media content items selected for playback at a corresponding one of the plurality of playback devices; and utilizing Digital Rights Management (DRM) encoding to restrict playback of the plurality of coordinated media content items at the plurality of playback devices such that the plurality of coordinated media content items are coordinated during playback at the plurality of playback devices, wherein utilizing DRM encoding to restrict playback of the plurality of coordinated media content items comprises:

segmenting each of the plurality of coordinated media content items into a plurality of segments;

generating rights segments for the plurality of segments of each of the plurality of coordinated media content items to restrict playback of the plurality of segments of each of the plurality of coordinated media content items such that the plurality of coordinated media content items are coordinated during playback at the plurality of playback devices;

encoding the plurality of segments of each of the plurality of coordinated media content items to provide a plurality of encoded segments of each of the plurality of coordinated media content items; and for each one of the plurality of playback devices, providing the plurality of encoded segments for a corresponding one of the plurality of coordinated media content items and the rights segments for the plurality of encoded segments for the corresponding one of the plurality of coordinated media content items to the one of the plurality of playback devices, wherein playback of the plurality of encoded segments is restricted such that advertisement slots within the plurality of coordinated media content items remain coordinated during playback at the plurality of playback devices.

2. The method of claim 1 wherein the rights segments for the plurality of segments comprise a start time for each one of the plurality of segments defining a time at which playback of each one of the plurality of segments is to begin.

3. The method of claim 2 wherein the rights segments for the plurality of segments further comprise an end time for each one of the plurality of segments defining a time at which rights to playback of each one of the plurality of segments end.

4. The method of claim 3 wherein a time between the start time and the end time for each one of the plurality of segments is equal to a play length of the one of the plurality of segments.

5. The method of claim 3 wherein a time between the start time and the end time for each one of the plurality of segments is equal to a play length of the one of the plurality of segments plus some additional amount of time.

6. The method of claim 1 wherein coordinating advertisement slots comprises at least one of a group consisting of: inserting advertisement slots in the media content items, extending existing advertisement slots in the media content items, and condensing advertisement slots in the media content items.

7. The method of claim 1 wherein coordinating the advertisement slots comprises synchronizing the advertisement slots in the plurality of media content items.

8. The method of claim 1 further comprising selecting advertisements for the advertisement slots in the plurality of media content items.

9. The method of claim 1 wherein the plurality of media content items are heterogeneous media content items.

10. The method of claim 1 wherein the plurality of media content items are homogeneous media content items.

11. The method of claim 1 further comprising obtaining at least one the plurality of media content items from local storage.

12. The method of claim 1 further comprising obtaining at least one the plurality of media content items from a remote source.

13. A system comprising:
a) a communication interface communicatively coupling the system to a plurality of playback devices; and
b) a control system associated with the communication interface and adapted to:
i) coordinate a plurality of different media content items selected for playback at the plurality of playback devices to provide a plurality of coordinated media content items, each of the plurality of different media content items selected for playback at a corresponding one of the plurality of playback devices;
ii) utilize Digital Rights Management (DRM) encoding to restrict playback of the plurality of coordinated media content items at the plurality of playback devices such that the plurality of coordinated media content items are coordinated during playback at the plurality of playback devices;
iii) segment each of the plurality of coordinated media content items into a plurality of segments; and
iv) generate rights segments for the plurality of segments of each of the plurality of coordinated media content items to restrict playback of the plurality of segments of each of the plurality of coordinated media content items such that the plurality of coordinated media content items are coordinated during playback at the plurality of playback devices;
v) encode the plurality of segments of each of the plurality of coordinated media content items to provide a plurality of encoded segments of each of the plurality of coordinated media content items; and
vi) for each one of the plurality of playback devices, provide the plurality of encoded segments for a corresponding one of the plurality of coordinated media content items and the rights segments for the plurality of encoded segments for the corresponding one of the plurality of coordinated media content items to the one of the plurality of playback devices, wherein playback of the plurality of encoded segments is restricted such that advertisement slots within the plurality of coordinated media content items remain coordinated during playback at the plurality of playback devices.

14. The system of claim 13 wherein the rights segments for the plurality of segments comprises a start time for each one of the plurality of segments defining a time at which playback of each one of the plurality of segments is to begin.

15. The system of claim 14 wherein the rights segments for the plurality of segments further comprises an end time for each one of the plurality of segments defining a time at which rights to playback of each one of the plurality of segments end.

16. The system of claim 13 wherein the control system is further adapted to select advertisements for the advertisement slots in the plurality of media content items.

17. The system of claim 13 wherein the plurality of media content items are heterogeneous media content items.

18. The system of claim 13 wherein the plurality of media content items are homogeneous media content items.

* * * * *